(12) United States Patent
Lagrand et al.

(10) Patent No.: US 12,320,686 B2
(45) Date of Patent: Jun. 3, 2025

(54) FLOWMETER WITH ATTENUATING RIBBED TRANSDUCER HOUSINGS

(71) Applicant: OneSubsea IP UK Limited, London (GB)

(72) Inventors: Emmanuel Lagrand, Sandsli (NO); Erlend Bjoerndal, Sandsli (NO); Gregor Brown, Edinburgh (GB); Emanuel J. Gottlieb, Pittsburgh, PA (US)

(73) Assignee: OneSubsea IP UK Limited, London (GB)

( * ) Notice: Subject to any disclaimer, the term of this patent is extended or adjusted under 35 U.S.C. 154(b) by 0 days.

(21) Appl. No.: 16/798,479

(22) Filed: Feb. 24, 2020

(65) Prior Publication Data

US 2020/0271493 A1 Aug. 27, 2020

Related U.S. Application Data

(60) Provisional application No. 62/809,106, filed on Feb. 22, 2019.

(51) Int. Cl.
*G01F 1/66* (2022.01)
*E21B 47/107* (2012.01)

(52) U.S. Cl.
CPC .............. *G01F 1/66* (2013.01); *E21B 47/107* (2020.05); *G01F 1/662* (2013.01)

(58) Field of Classification Search
CPC ........... G01F 1/66; G01F 1/662; E21B 47/107
See application file for complete search history.

(56) References Cited

U.S. PATENT DOCUMENTS

| 3,906,780 A | 9/1975 | Baldwin |
| 4,532,812 A | 8/1985 | Birchak |
| 4,893,496 A * | 1/1990 | Bau ........................ G01F 1/66 |
| | | 73/152.55 |
| 4,949,317 A | 8/1990 | McQuitty et al. |
| 5,275,060 A | 1/1994 | Lynnworth |

(Continued)

FOREIGN PATENT DOCUMENTS

| CN | 102879044 A | 1/2013 |
| CN | 107366532 A | 11/2017 |

(Continued)

OTHER PUBLICATIONS

Extended Search Report received in European Patent Application No. 20159085.8 dated Jul. 10, 2020, 8 pages.

(Continued)

*Primary Examiner* — Jonathan M Dunlap
(74) *Attorney, Agent, or Firm* — Jeffrey D. Frantz (57) ABSTRACT

A flowmeter with ribbed housings for accommodating transducers. The ribbed housings may be of a profile to attenuate or dampen acoustic noise which occurs as a transducer emits frequencies across housing walls toward a fluid flow path of the flowmeter. Thus, as transducers receive flow velocity data, it may be collected for analysis in a manner that substantially eliminates the inclusion of noise within the data to be analyzed. Once more, this is achieved in a manner that utilizes a monolithic housing in place of a segmented or multi-component housing that is prone to include polymeric and other parts subject to premature wear and failure.

20 Claims, 5 Drawing Sheets

(56) References Cited

U.S. PATENT DOCUMENTS

| | | | |
|---|---|---|---|
| 5,955,677 A * | 9/1999 | Holliday | F16L 15/009 |
| | | | 73/756 |
| 6,526,838 B1 * | 3/2003 | Froelich | G01F 1/662 |
| | | | 73/861.28 |
| 6,837,098 B2 | 1/2005 | Gysling et al. | |
| 7,503,217 B2 | 3/2009 | Johansen | |
| 7,578,203 B2 | 8/2009 | Andersen et al. | |
| 8,225,665 B2 | 7/2012 | Geir et al. | |
| 9,803,976 B2 | 10/2017 | Simonetti et al. | |
| 2008/0084321 A1 | 4/2008 | Hatch et al. | |
| 2008/0306396 A1 * | 12/2008 | Ariav | A61B 5/4818 |
| | | | 600/527 |
| 2011/0080807 A1 | 4/2011 | Instanes et al. | |
| 2012/0048038 A1 | 3/2012 | Furlong | |
| 2012/0125121 A1 * | 5/2012 | Gottlieb | G01F 1/665 |
| | | | 73/861.28 |
| 2015/0136842 A1 * | 5/2015 | Allen | G01F 15/14 |
| | | | 228/219 |
| 2015/0184511 A1 | 7/2015 | Gordon et al. | |
| 2017/0328163 A1 | 11/2017 | Shirani et al. | |
| 2018/0163528 A1 | 6/2018 | Smith et al. | |
| 2019/0033898 A1 | 1/2019 | Shah et al. | |
| 2020/0033174 A1 | 1/2020 | Nogueira et al. | |
| 2020/0284765 A1 * | 9/2020 | Rustad | E21B 47/107 |

FOREIGN PATENT DOCUMENTS

| | | |
|---|---|---|
| EP | 1192457 B1 | 1/2013 |
| EP | 3376177 A1 | 9/2018 |
| GB | 2399637 A | 9/2004 |
| GB | 2431993 A | 5/2007 |
| GB | 2457663 A | 8/2009 |
| GB | 2537654 A | 10/2016 |
| NO | 301948 B1 | 12/1997 |
| NO | 325153 B1 | 2/2008 |
| NO | 20150489 A1 | 10/2016 |
| WO | 0072000 A1 | 11/2000 |
| WO | 2005121770 A1 | 12/2005 |

OTHER PUBLICATIONS

Extended Search Report received in European Patent Application No. 20159081.7 dated Jul. 15, 2020, 9 pages.

Folkestad, T. et al., "Paper 17—Operating Experience with two Ultrasonic Gas meters in Series", 21st North Sea Flow Measurement Workshop 2003, 27 pages.

Communication Pursuant to Article 94(3) received in European Patent Application No. 20159081.7 dated Oct. 28, 2021, 6 pages.

Office Action issued in U.S. Appl. No. 16/798,485 dated Feb. 26, 2024, 15 pages.

* cited by examiner

FLOWMETER WITH ATTENUATING RIBBED TRANSDUCER HOUSINGS

BACKGROUND

Exploring, drilling and completing hydrocarbon and other wells are generally complicated, time consuming and ultimately very expensive endeavors. This is particularly true in the case of offshore operations where expenses may grow exponentially long after the completion of the well. For example, subsequent routing intervention and maintenance may require considerably more time, effort and cost at the subsea oilfield.

In recognition of these potentially enormous expenses, added emphasis has been placed on well monitoring and maintenance throughout the life of the well. That is, placing added emphasis on increasing the life and productivity of a given well may help ensure that the well provides a healthy return on the significant investment involved in its completion. So, for example, it may be of benefit to cost effectively monitor well conditions such as pressure, temperature, or production fluid flow with an accurate flowmeter and in real-time where possible. Of course, what is cost effective may depend on the circumstances.

For flowmeters utilized at a land-based "topside" oilfield, the monitoring of single phase production fluids may be effectively tracked with permanently installed ultrasonic flow-meters in production tubing or other locations where production fluids are channeled. Regardless, like other equipment, these flowmeters are more readily accessible than flowmeters utilized in the subsea environment, even if located at or below a wellhead. As a result, such ultrasonic flowmeters may be designed in a way that allows for cost-effective replacement many times over the course of the life of the well.

Topside ultrasonic flowmeter designs may take into account the practical advantage of replicability. For example, the ultrasonic transducer of such a flowmeter includes a piezo-electric element that is prone to generate noise which could affect accuracy of flow readings. However, this issue may be addressed by decoupling housing components and inserting nitrile or polymer-based, sealed O-rings and spacers which can serve to dampen or interrupt the propagation of such noise. These features tend to break down over time in the harsh, high temperature oilfield environment, for example, after years of exposure to continuously flowing production fluids. Nevertheless, as noted above, it remains cost effective to replace such flowmeter components periodically, perhaps on a predetermined basis, such as every 2-5 years, by way of example.

Unfortunately, replacing topside flowmeters due to the intentional use of dampening features that are prone to fail still introduces added costs to operations. Furthermore, this cost is no longer practical when the circumstances are changed to the subsea environment. In the subsea environment regular change-out of equipment such as pumps and flowmeters is not just costly but, generally speaking, entirely impractical. These types of change-outs may introduce delay and expenses ranging in the millions in today's dollars. As a result, suitable equipment for this environment is generally rated at 20 to 30 years or more. The possibility of a predetermined change-out of subsea ultrasonic flowmeter components every 2-5 years is simply not a practical option. Therefore, the disadvantage of requiring a periodic change-out of topside ultrasonic flowmeter components turns into the reality of completely unavailable subsea ultrasonic flowmeters.

Ultimately, given the impracticality of ultrasonic flowmeters for subsea use, operators are left with a variety of disadvantageous options. Venturi flowmeters that introduce an undesirable pressure drop, complex and expensive multi-phase flowmeters and other options are available. However, these types of flowmeters come with added equipment expense and/or a functionality that is not directed at high accuracy detection of single phase fluid flows. As a practical matter, the option of a subsea ultrasonic flowmeter for long term installation and use remains unavailable.

SUMMARY

A flowmeter design is detailed that utilizes a unique transducer assembly. The assembly includes a transmitter in a housing. The transmitter is configured to direct acoustic signal past a wall of the transmitter housing and toward an adjacent flow path. The assembly also includes at least one attenuating rib that is physically coupled to the housing at a location opposite that of the flow path.

DETAILED DESCRIPTION

In the following description, numerous details are set forth to provide an understanding of the present disclosure. However, it will be understood by those skilled in the art that the embodiments described may be practiced without these particular details. Further, numerous variations or modifications may be employed which remain contemplated by the embodiments as specifically described.

Embodiments are described with reference to certain types of downhole hydrocarbon recovery operations. In particular, focus is drawn to flowmeters and techniques applied to permanent subsea installations for long term flow monitoring. However, tools and techniques detailed herein may be employed in a variety of other manners. For example, embodiments of flowmeters as detailed herein may be configured for use "topside" at a surface-based oilfield. Indeed, such flowmeters may even be employed outside of the oilfield environment altogether. Regardless, so long as a flowmeter incorporates a rib attenuating transducer assembly, appreciable benefit may be realized.

Figure 1:
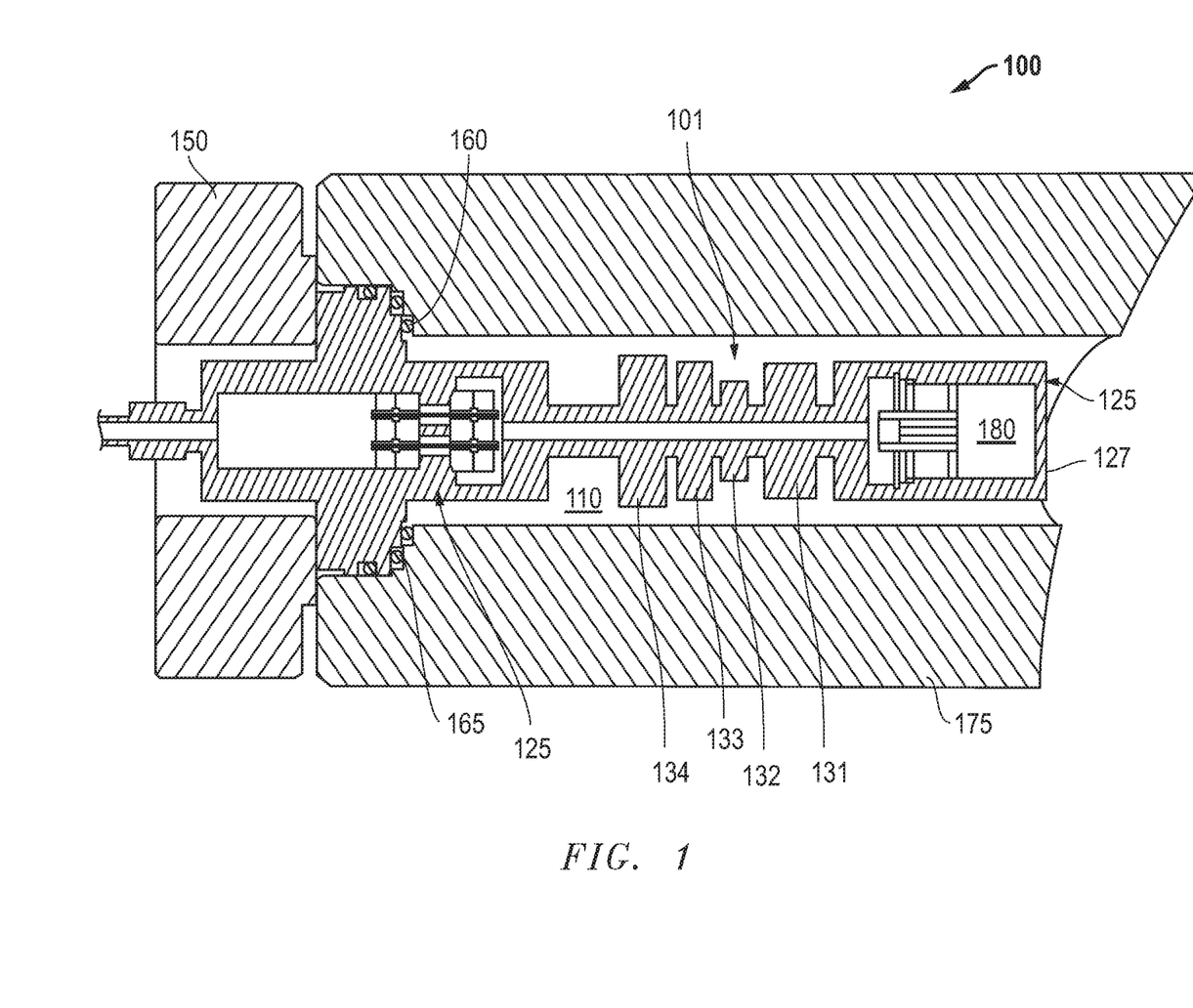
FIG. 1 is a side cross-sectional view of an embodiment of a rib attenuating transducer assembly for a flowmeter.

Referring now to FIG. 1, a side cross-sectional view of an embodiment of a rib attenuating transducer assembly 100 is shown. With added reference to FIGS. 2 and 4, the assembly 100 is configured for incorporation into a flowmeter 200. Ultimately, this flowmeter 200, equipped with a plurality of rib attenuating transducer assemblies, may be particularly well suited for subsea use such as at the oilfield 400 of FIG. 4. However, there may also be distinct advantages to utilizing such a flowmeter 200 at surface or within a well, regardless of whether or not the associated wellhead is at a seabed or on land.

Continuing with reference to FIG. 1, the transducer assembly 100 includes a transducer 180 that is disposed within a transducer housing 125. In the embodiment shown, the transducer 180 is outfitted with a piezo-electric device or other suitable element for operating at ultrasonic frequencies. Thus, the assembly 100 is well suited for supporting flowmeters directed at detecting single phase fluid flows, particularly gases. More specifically, as detailed further below, the depicted transducer assembly 100 may pair up with an adjacent transducer assembly 201 of the flowmeter 200 shown in FIG. 2 to cooperatively detect a flowing fluid.

Figure 2:
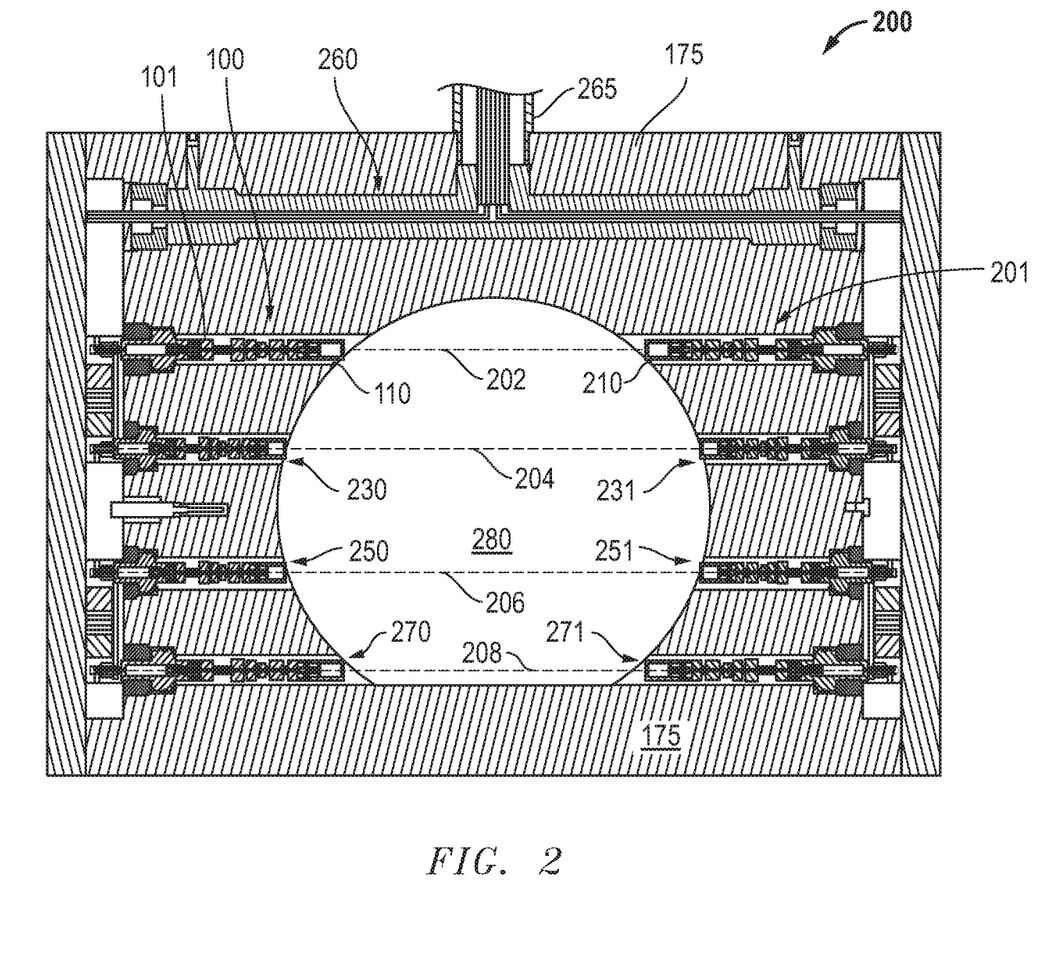
FIG. 2 is a side cross-sectional view of a flowmeter incorporating the transducer assembly of FIG. 1.

With added reference to FIG. 2, this detection of fluid flow velocity includes a conventional mode of the transducer 180 detecting known acoustic frequencies from the adjacent assembly 201 with fluid flow interference being an indicator of fluid velocity. As indicated above, these frequencies may be ultrasonic, perhaps in the 100-300 kHz range. Of course, while the transducer 180 is making such detections, it is also emitting the same frequencies toward the adjacent assembly 201. With specific reference to the illustration shown in FIG. 1, this means that ultrasonic transmissions that are directed from the transducer 180 and toward the adjacent flow path 280 of FIG. 2, first cross the physical front face 127 of the housing 125.

While the described transmissions may serve to help determine fluid flow velocity as noted, they also result in vibrational noise as they cross the structure of the housing 125. That is, vibrations in the housing 125 which result from the ultrasonic transmissions from the transducer 180 toward the flow path 280 of FIG. 2 are not an indicator of fluid velocity. Rather, they are mere noise from the transducer 180 itself. However, this "noise" is not necessarily readily distinguishable as noise. That is, while detections by the transducer 180 from the adjacent assembly 201 of FIG. 2 are intended to provide fluid velocity information, the described "noise" is not meant as such and may skew accuracy if factored into the analyzed data. That is, as ultrasonic or other acoustic frequencies are received by the assembly 100, they may propagate from the location of the transducer 180 toward a flange 150. This has the potential to create noise issues because it is only the ultrasonic frequency from the adjacent assembly 201 that is meant to be factored into such analysis. Other frequency information which results from vibrational "noise" propagating along the housing 125 from the location of the transducer 180 as described could skew the analysis.

In order to substantially eliminate the possibility of the described "noise" from reaching the flange 150 and compromising accuracy of the noted analysis, the housing 125 of FIG. 1 includes a ribbed profile 101. In the embodiment shown, this ribbed profile 101 is located between the main front of the housing 125 and the flange 150. In this way a plurality of ribs 131, 132, 133, 134 may serve to filter out or attenuate vibrational noise that emerges mainly from the location at the front face 127 of the housing 125. As detailed further below, substantially preventing this noise from reaching the flange 150 means that the data which does reach the flange 150 is limited to the intended indicator of fluid flow velocity detected by the transducer 180 from the opposite assembly 201 (see FIG. 2).

In the embodiment shown, the ribbed profile 101 includes four ribs 131, 132, 133, 134. However, pluralities of different numbers of ribs may be utilized, including the use of a single rib. As detailed further below, the exact number, profile and size of each rib may be determined through modeling and experimental verification, accounting for factors such as the frequencies to be expected and the dimensions of the overall housing 125 and assembly 100 as well as the materials utilized.

For example, in the embodiment shown, the overall assembly 100 depicted may be 10-15 cm long from the front face 127 of the housing 125 to the flange 150. The transducer 180 may be configured to operate in the 100-300 kHz range, perhaps tailored toward gas flow rate detection. The housing 125 may be a metal-based material suitable for long term exposure to subsea conditions with the front portion 127 of the housing 125 having a diameter of 20-25 mm. Modeling for rib dimensions in this embodiment may take into account such sizing, frequencies and materials with a focus on attenuating noise traveling from the front portion 127 toward the flange 150 before reaching the flange 150. So, for example, in such a circumstance, the ribs 131, 132, 133, 134 may range in diameter from 10-25 mm with a width of between 1-5 mm between the ribs 131, 132, 133, 134 and/or between the first rib 131 and the front portion 127 of the housing 125.

Of course, these frequencies, materials, dimensions and other depicted aspects of the rib profile 101 are for illustrative purposes only. In many cases it may be useful that the first rib 131 be of a size and morphology for attenuating a majority of the described noise. In many cases it may be effective that the first rib 131 and the last rib 134 be the largest of the ribs in overall structural volume. Of course, this is not required. Additionally, the more effective rib geometries may change as operational parameters change. For example, the embodiment shown is tailored toward gas flow detection as indicated above. However, where the assembly 100 is expected to be utilized more for liquid phase detection, transducer frequencies may be over 1 MHz with the ribs 131, 132, 133, 134 being smaller and thinner than the dimensions noted above.

Continuing with reference to FIG. 1 with added reference to FIG. 2, the monolithic housing 125 of the assembly 100 is secured within the flowmeter body 175 by the flange 150 at one end and metal to metal seals 160, 165 which serve as first and second level pressure barriers. Alternatively, welding may be utilized. Regardless, the housing 125 suspends the transducer 180 in a channel 110 of the flowmeter 200 that is exposed to the flow path 280 in a unique manner. Namely, this means that the assembly 100 takes on a monolithic form in a way that also facilitates the attenuation of noise without the introduction of threading components, nitrile material, polymeric O-rings, seals, spacers or other features that would be subject to a higher rate of deterioration and failure in an oilfield environment whether subsea or topside. Thus, an ultrasonic transducer assembly 100 and flowmeter 200 are provided that may be suitable for continuous oilfield use for an extended period. For example, embodiments such as that depicted may be rated for effective continuous use over a 20-30 year period without need for replacement.

Referring specifically now to FIG. 2, a side cross-sectional view of a flowmeter 200 is shown that incorporates the transducer assembly 100 of FIG. 1. In this depiction, the manner in which this assembly 100 works cooperatively with a transducer assembly 201 at the opposite side of the flow path 280 is apparent. Specifically, a transmission path 202 between the two is shown. Transmissions from one assembly 201 to the other assembly 100 may be detected at the transducer 180 and directed toward the flange 150 as described above. However, more notably, as also described above, these detected transmissions which may provide the sought after flow rate information from the flow path 280 may be analyzed without any material noise interference from a vibrating housing 125 (see FIG. 1). Once more this is achieved without the need for intervening nitrile or polymer-based features due to the rib profile 101 of the assembly 100.

Continuing with reference to FIG. 2, the described substantially noise-free analysis that is facilitated by the unique geometry of the transducer assembly 100 of the first channel 110 is repeated not only at the opposite paired assembly 201 but on several different levels of the flowmeter 200. That is, the second channel 210 accommodates the paired assembly 201 as described with each of these first two assemblies 100, 201 operating off of the same transmission path 202. However, in the embodiment shown, this manner of transmission and detection is repeated four fold with three other transmission paths 204, 206, 208. Once more each path 204, 206, 208 supports a shared pair of assemblies disposed in channels at opposite sides of the flow path 280. Specifically, channels 230 and 231 cooperate at path 204, channels 250, 251 at path 206 and channels 270, 271 at path 208. In each circumstance, the assemblies include a monolithic housing and ribbed profile such as that detailed in FIG. 1. Thus, eight different detections are supported which combine to translate into substantially noise-free analysis of the flow rate of fluid through the flow path 280.

In the embodiment shown, the data obtained may be combined or separately routed through electronics packaging 260. Ultimately, the data may be analyzed and periodically routed away from the flowmeter 200 through a conduit 265 for surface review. However, the data collected in this manner remains substantially free of noise that might compromise the accuracy of the determined flow rate of fluid through the flow path 280.

Figure 3A:
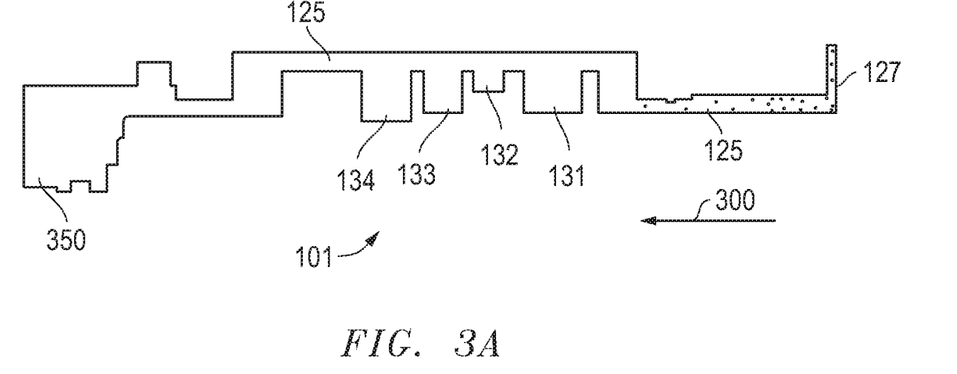
FIG. 3A is a side schematic view of a profile portion of the transducer of FIG. 1 at given point in time following activation of a transducer of the assembly.
Figure 3B:
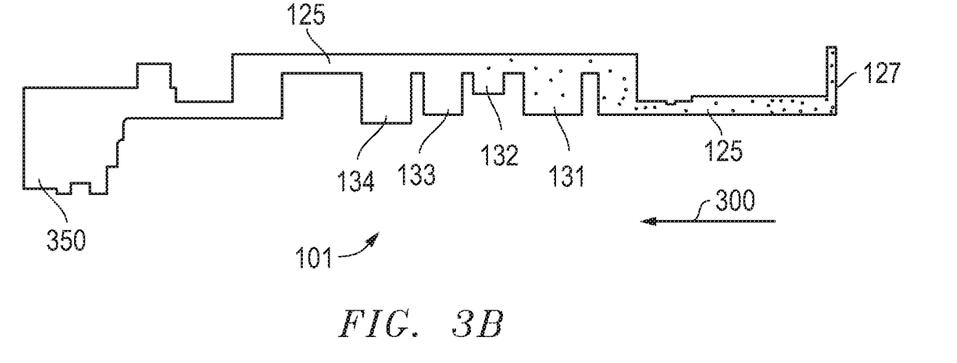
FIG. 3B is a side schematic view of the profile portion of the transducer at a later point in time after the given point in time of FIG. 3A.
Figure 3C:
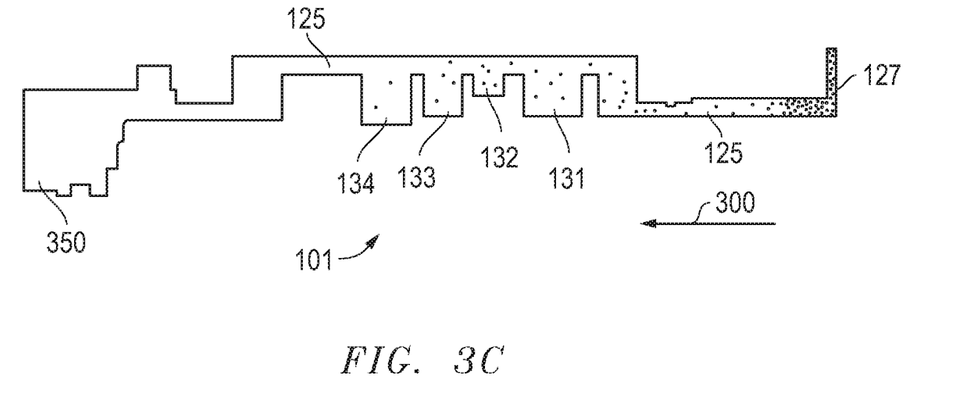
FIG. 3C is a side schematic view of the profile portion of the transducer at a last point in time after the later point in time of FIG. 3B.

Referring to FIGS. 3A-3C, side schematic view of a profile portion of the transducer housing 125 is shown as noise, illustrated in the form of stippling, propagates from the front face 127 to a rear portion 350 of the housing 125 (see arrow 300). More specifically, with added reference to FIG. 1, FIG. 3A depicts the housing 125 at a first point in time following activation of the transducer 180. At the outset, a minor amount of vibrating noise is apparent at the portion of the housing 125 closest to the transducer 180 (e.g. at the front face 127).

Continuing with reference to FIG. 3B, a side schematic view of the profile portion of the transducer housing 125 is shown at a later point in time after the given point in time of FIG. 3A. At this time, a greater amount of noise is apparent in the front portion of the housing 125. Additionally, noise is beginning to reach the first rib 131 and slightly beyond.

FIG. 3C is another side schematic view of the profile portion of the transducer housing 125. However, at this last depicted point in time, the propagation of the noise has changed. Specifically, notice that in terms of the overall rib profile 101, the majority of the illustrated stippling or noise fails to propagate beyond the first rib 131. That is, even though some degree of noise has made it all the way to the last rib 134, most of the noise stops propagating upon encountering the first rib 131. Once more the next supplemental ribs 132, 133, capture most of the remaining noise such that very little is left to reach the last rib 134 or beyond. In the embodiment shown, a negligible amount of noise reaches beyond the last rib 134 headed toward the rear portion 350 of the housing 125. Indeed, a portion of this noise may even reach the flange 150 (see FIG. 1). However, the amount of noise that ultimately factors into detected analysis is so minor that flow rate analysis is not significantly compromised.

Continuing with reference to FIGS. 3A-3B, the particular rib profile 101 depicted may be established based on a variety of optimization techniques including transient analysis with recorded results in advance of employing an assembly 100 (see FIG. 1). Additionally, the profile 101 refers to the attenuating projections as ribs 131, 132, 133, 134 due to the resulting appearance. However, the term "ribs" is not meant to infer any particular morphology or shape. Following different optimization runs, accounting for a various operational parameters, a variety of differently shaped projections may emerge as suitable for dampening of the noise as described herein. This may even include the use of ribs which extend inward relative the housing 125 and not just outward as shown herein. Indeed, both internal and external "ribs" may be used in the same housing 125 and even at the same axial location of the same housing 125.

Figure 4:
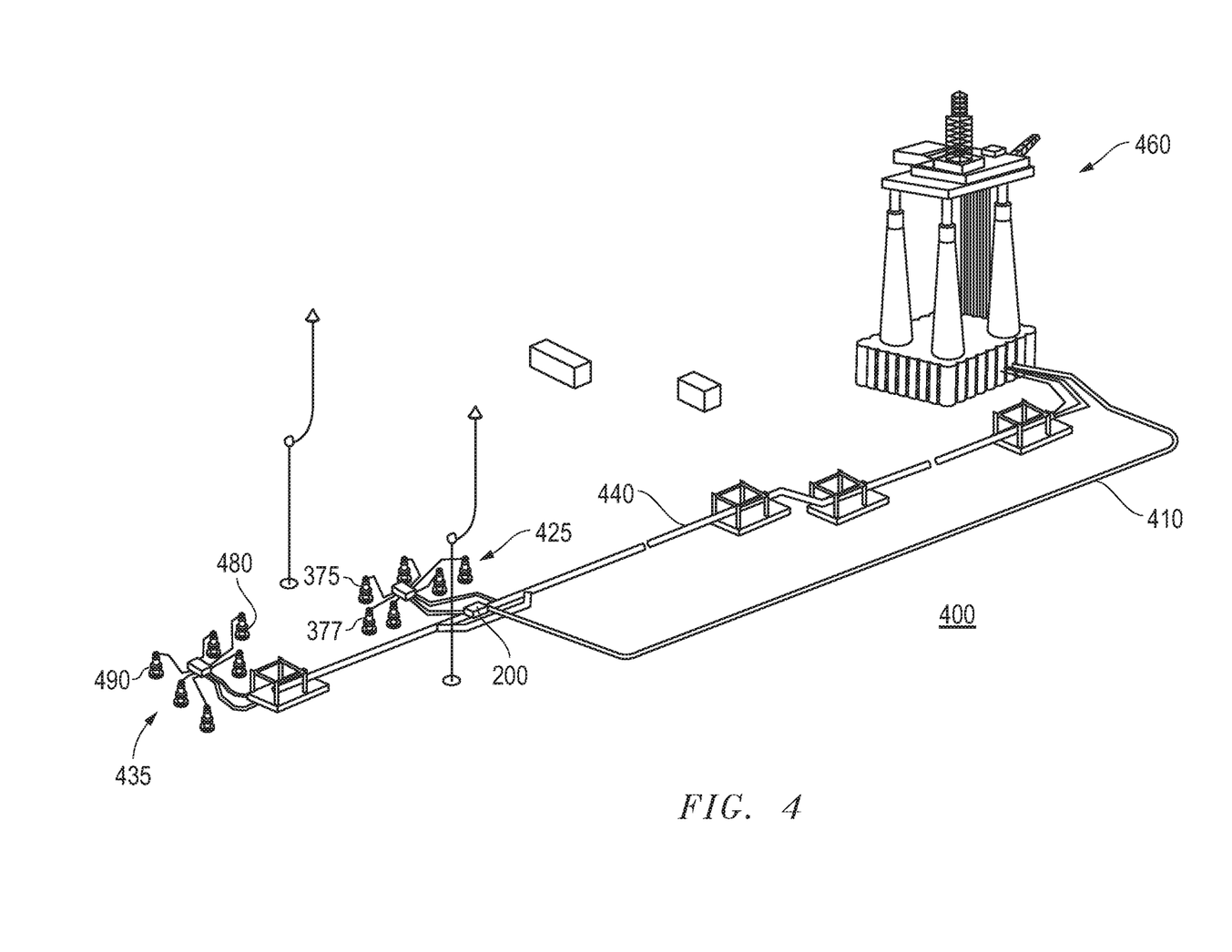
FIG. 4 is an overview depiction of a subsea oilfield employing the flowmeter of FIG. 2.

Referring now to FIG. 4, an overview depiction of a subsea oilfield 400 is shown employing the flowmeter 200 of FIG. 2. In this particular layout, multiple well clusters 425, 435 including subsea trees 375, 377, 480, 490 are shown for obtaining and routing production fluids through installed pipelines 410, 440, eventually leading to an offshore platform 460 for collection. Operations may be directed from the platform 460 and aided by a real time display of production flow rate.

As indicated above, a flowmeter 200 employing ribbed transducers may be uniquely beneficial to such operations. Not only is a simple, largely monolithic geometry provided, but an assembly that may be installed and left for 20-30 years or longer without need of change-out is provided. This is beneficial in any environment, but particularly in the offshore environment where such a change-out can be exorbitantly expensive.

Figure 5:
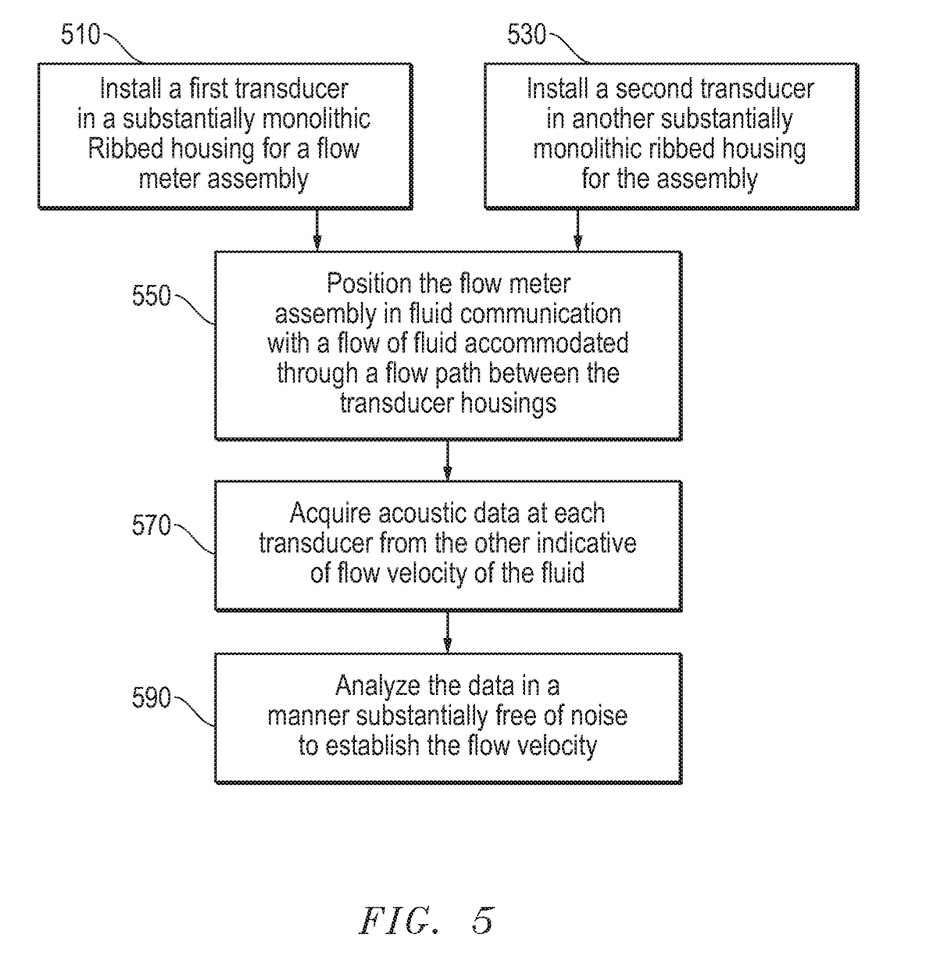
FIG. 5 is a flow-chart summarizing an embodiment of employing the flowmeter of FIG. 2.

Referring now to FIG. 5 is a flow-chart summarizing an embodiment of assembling and employing the flowmeter of FIG. 2. As illustrated, first and second transducer assemblies are put together employing substantially monolithic ribbed housings as indicated at 510 and 530. Thus, once assembled, a flowmeter which utilizes these types of transducer assemblies may be positioned in communication with a flow of fluid that is to be detected and analyzed for velocity (see 550). Specifically as indicated at 570, acoustic data such as ultrasonic data may be emitted by each transducer with each acquiring data from the other which has been affected by the flow of fluid. However, most notably, due to the unique ribbed housings as detailed herein, the acquired data may be transmitted for analysis in a manner that is substantially free of noise that might otherwise affect the accuracy of the determined flow velocity (see 590).

Embodiments described hereinabove include practical options for long term installation of flowmeters even in harsh environments, whether topside, subsea or even outside of the oilfield. This is particularly advantageous for subsea applications given the extreme challenges involved in change-out of subsea flowmeters. However, even at surface or anywhere else, the availability of a near permanently installed reliable flowmeter is advantageous. This is particularly true where gas fluid flow velocity is to be detected given the lack of practical suitable alternatives to ultrasonic flowmeters.

The preceding description has been presented with reference to presently preferred embodiments. However, other embodiments and/or features of the embodiments disclosed but not detailed hereinabove may be employed. For example, the monolithic nature of the ribbed transducer housing may make it well suited, not only for long-term operations, but also for high temperature applications or where extreme temperature ranges are prone to occur (e.g. from about −46° C. to about 205° C.). Furthermore, persons skilled in the art and technology to which these embodiments pertain will appreciate that still other alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. A transducer assembly for a flowmeter, the assembly comprising:
    a transducer to direct an acoustic signal past a wall of a transducer housing and toward an adjacent flow path of the flowmeter;
    a plurality of attenuating ribs adjacent the transducer and physically coupled to the transducer housing at a location opposite that of the flow path, wherein a first rib of the plurality of attenuating ribs in closest proximity to the transducer housing is of a first geometry and a supplemental rib of the plurality of attenuating ribs adjacent the first rib is of a second geometry, and the first geometry differs from the second geometry in both diameter and width; and
    at least one seal disposed between the transducer housing and a body of the flowmeter that provides metal to metal contact.

2. The assembly of claim 1, wherein the transducer is an ultrasonic transducer.

3. The assembly of claim 1, wherein the attenuating ribs of the plurality of attenuating ribs are in axial alignment with the transducer housing.

4. The assembly of claim 3, wherein the rib in closest proximity to the transducer housing is configured to attenuate a majority of acoustic noise propagated from the transducer and beyond the transducer housing in a direction opposite that of the flow path.

5. The assembly of claim 4, wherein the attenuating ribs are spaced apart on the transducer housing by between 1 mm and 5 mm.

6. The assembly of claim 4, wherein the attenuating ribs extend inwardly into the transducer housing from a surface of the transducer housing.

7. The assembly of claim 4, wherein the attenuating ribs extend outwardly from a surface of the transducer housing.

8. The assembly of claim 7, wherein the attenuating ribs of the plurality of attenuating ribs are between 10 mm and 25 mm in outer diameter.

9. A flowmeter for installation at an oilfield, the flowmeter comprising:
    a flowmeter body with at least one pair of channels, each channel of the pair located at opposite sides of a flow path;
    a monolithic housing secured within each channel to accommodate a transducer for acquiring flow velocity data for a fluid flowing through the flow path, each monolithic housing having a ribbed profile to substantially eliminate noise during operation of the transducer, wherein the ribbed profile comprises a plurality of attenuating ribs adjacent the transducer and physically coupled to the monolithic housing at a location opposite that of the flow path, wherein a first rib of the plurality of attenuating ribs in closest proximity to the monolithic housing is of a first geometry and a supplemental rib of the plurality of attenuating ribs adjacent the first rib is of a second geometry, and wherein the first geometry differs from the second geometry in both diameter and width; and
    a seal disposed between each monolithic housing and the flowmeter body that provides metal to metal contact.

10. The flowmeter of claim 9, wherein the oilfield is one of a subsea oilfield and a topside oilfield.

11. The flowmeter of claim 9, wherein the first rib is configured to attenuate a majority of the noise, and
    the supplemental rib adjacent the first rib is configured to attenuate noise remaining after attenuation of noise by the first rib.

12. The flowmeter of claim 9, wherein a flange is adjacent each channel to secure each monolithic housing within each channel.

13. The flowmeter of claim 12, wherein each seal is disposed at an interface between each monolithic housing and the body of the flowmeter at a location defining each channel.

14. A method of determining a velocity of a flow of fluid, the method comprising:
    routing the flow of fluid through a flow path disposed between a first transducer and a second transducer of a flowmeter, wherein the first transducer is housed within a first ribbed monolithic housing, the second transducer is housed within a second ribbed monolithic housing, each of the first ribbed monolithic housing and the second ribbed monolithic housing are secured within a body of the flowmeter by one or more flanges and seals that provide metal to metal contact, the first ribbed monolithic housing comprises a plurality of attenuating ribs adjacent the first transducer, wherein the first rib of the plurality of attenuating ribs in closest proximity to the first ribbed monolithic housing is of a first geometry and a supplemental rib of the plurality of attenuating ribs adjacent the first rib is of a second geometry, and the first geometry differs from the second geometry in both diameter and width;
    transmitting an acoustic frequency across a wall of the first ribbed monolithic housing and through the flow path from the first transducer to the second transducer; and
    dampening acoustic noise from the wall during the transmitting with at least the first rib of the first ribbed monolithic housing.

15. The method of claim 14, further comprising establishing a profile for the first ribbed monolithic housing with a transient analysis optimization technique before the routing of the flow.

16. The method of claim 14, wherein the acoustic frequency is ultrasonic.

17. The method of claim 16, wherein the acoustic frequency is between about 100 kHz and about 300 kHz.

18. The method of claim 17, wherein the method is performed in a subsea environment and the fluid is a hydrocarbon gas.

19. The method of claim 18, further comprising effectively performing the method in the environment with the flowmeter for a period in excess of 20 years.

20. The method of claim 14, further comprising effectively performing the method in an environment subject to temperature ranges in excess of about 150° C.

* * * * *